(12) United States Patent
Honda et al.

(10) Patent No.: US 6,395,412 B1
(45) Date of Patent: May 28, 2002

(54) MAGNETIC RECORDING MEDIA, MANUFACTURING METHOD FOR THEREOF AND APPARATUS FOR USING THE MEDIA

(75) Inventors: Yoshinori Honda, Hiratsuka; Yuuichi Kokaku, Yokohama; Mitsuhiro Shoda; Toshinori Ono, both of Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/399,228

(22) Filed: Sep. 20, 1999

(30) Foreign Application Priority Data

May 24, 1999 (JP) .......................................... 11-142756

(51) Int. Cl.$^7$ .............................. G11B 5/66; G11B 5/70
(52) U.S. Cl. ........................ 428/694 TR; 428/694 TS; 428/694 TC; 428/694 SG; 428/212
(58) Field of Search ................... 428/694 TS, 694 TR, 428/694 SG, 900, 694 TC, 212; 360/135; 427/533, 535, 537, 569, 576, 577, 130

(56) References Cited

U.S. PATENT DOCUMENTS 4,990,361 A * 2/1991 Yasunaga et al. ............. 427/36
5,616,426 A * 4/1997 Tenhover et al. ........... 428/688
5,762,766 A * 6/1998 Kurita et al. ............. 204/192.2
6,095,160 A * 8/2000 Chu ........................... 134/1.1

FOREIGN PATENT DOCUMENTS

| JP | 58-53026 | 3/1983 |
| JP | 60-119635 | 6/1985 |
| JP | 61-202324 | 9/1996 |

OTHER PUBLICATIONS

Sinha, S. K. et al, "X–ray and Neutron Scattering from Rough Surfaces", Physical Rev. B, vol. 38, No. 4 (Aug. 1, 1988).

* cited by examiner

Primary Examiner—Paul Thibodeau
Assistant Examiner—Holly Rickman
(74) Attorney, Agent, or Firm—Mattingly, Stanger & Malur, P.C.

(57) ABSTRACT

Surface roughness of the magnetic layer and the protective layer is flatter than the surface roughness of the substrate to decrease medium noise, hereby levitation stability of the magnetic head in the ultra low region and high density recording is obtained, for magnetic recording medium and magnetic disk apparatus of high reliability.

4 Claims, 6 Drawing Sheets

MAGNETIC RECORDING MEDIA, MANUFACTURING METHOD FOR THEREOF AND APPARATUS FOR USING THE MEDIA

BACKGROUND OF THE INVENTION

The present invention relates to magnetic recording medium, such as a magnetic disk, particularly of a quality wherein low noise and high recording density is obtained with flying stability at an ultra low flying height, and the manufacturing method and magnetic storage apparatus making and employing such medium.

Figure 1:
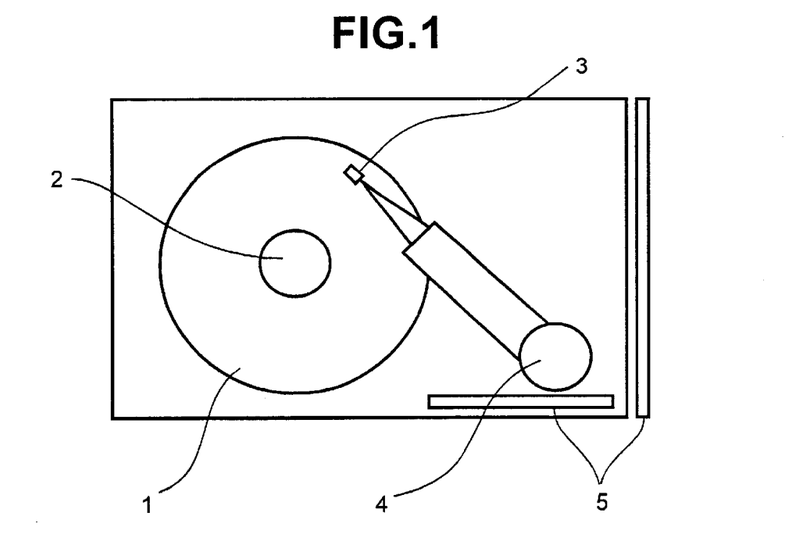
FIG. 1 is a general diagram of a magnetic storage apparatus, typical of the present invention.

Although FIG. 1 relates to a general magnetic recording disk drive of the present invention, it employs features that are broadly conventional, that is a magnetic recording disk 1, spindle 2 to hold and rotate the disk, a magnetic recording head 3 for reading and writing with respect to the disk, servomechanism 4 to position the head, and an electric circuit 5 for driving the above elements. In general, such a disk employs a magnetic recording medium that has an underlayer, a magnetic layer, and a protective layer, all laminated on a substrate. It is important that the read/write characteristics required in the magnetic recording medium provide for durability against the damage of the medium surface by contact with the magnetic head. Especially, it is important to prevent or reduce adsorption or adhesion between the magnetic disk and the magnetic head in the prior art by deposition to produce minute grooves, which are called texture, on the substrate surface, particularly in the circumferential direction or randomly by mechanical polishing using minute abrasive grains, or the like. This type of texture can also be obtained by deposition, particularly by sputtering to produce minute protrusions of the substrate or magnetic layer surface, or both. PTFE (Polytetrafluoroethylene) powder may be applied after a protective film is formed as a mask material, then the surface is etched by a dry etching method, and this produces an etching texture of the type mentioned above that has a ruggedness on the protective film surface. Examples of such prior art technology are the following.

Japanese patent Laid-Open No. 61-202324 discloses a mechanical polishing method, called "Texture" that forms microgrooves on a substrate, for example in the circumferential direction, to prevent the adsorption or adhesion between a magnetic disk and a magnetic head. Japanese patent Laid-Open No. 60-119635 discloses a sputtering method, called "Depot Texture" by forming minute protrusions on a substrate or a magnetic layer to obtain an effect r to that of "Texture". Japanese patent Laid-Open No. 58-53026 discloses a dry etching method, called "Etching Texture", that forms a ruggedness on the protective layer by dry etching using masks made of PTPE powder, etc., to obtain an effect similar to that of "Texture".

SUMMARY OF THE INVENTION

It is an object of the present invention to provide a magnetic recording medium, an apparatus employing such medium, and a method to produce such medium, wherein roughness of the magnetic layer is smaller than the roughness of the substrate, in the field or area where writing and reading is carried out by a magnetic recording head. Therefore, a magnetic recording medium and magnetic recording apparatus is obtained with high recording density and high reliability, by the method and structure of the present invention that reduces media noise and provides flying stability of the magnetic recording head at ultra low flying height, because of the reduced ruggedness of one or more of the underlayer, magnetic layer and protective layer, with respect to the roughness of the prior art.

An object of the present invention is to reduce or prevent adhesion of the magnetic head to the magnetic disk for increased reliability for assurance-proof of the contact start-stop (referred to as CS/S), which according to the above-mentioned prior art has previously involved increasing roughness and therefore reducing flying height in the prior art and reducing recording density in the prior art. Therefore, the present invention has simultaneously two objects that have heretofore been mutually exclusive of each other.

The inventors' analysis of the prior art problems and causes are a part of the present invention.

At the present time, high recording density involves a flying height of the magnetic head that is below 20 nm. As shown by conventional evaluation methods such as CS/S, durability and adhesion (friction) became difficult to obtain with respect to proof stress of the data plane because of irregularity in contacting between the head and medium. This was especially true with the adoption of LZT (Laser Zone Texture), wherein the CS/S zone and data plane or data field are distinguished, and this becomes more important with respect to reliability of the data plane. In general, damage from impact was lessened and adhesion of the magnetic head prevented by the prior art adoption of a lubricant and by adding minute grooves, previously referred to as texture or TEX, by the conventional machining of the data plane, which has the same surface as the CS/S zone. According to such prior art method, the TEX processing itself increases surface roughness of the substrate, and as the surface roughness of the substrate increases, necessarily the flying height of the magnetic head inevitably rises. Therefore, levitation start height in the medium plane of the magnetic head, Hto (the head takeoff height), also rises. Therefore, with such prior art technology, it is not possible to make the flying height of the magnetic head less than 20 nm or less, which is necessary to obtain ultra low flying height and high density. To obtain the flying height of 20 nm or less, it is necessary that the starting height of the levitation, that is Hto, be 10 nm or less, when dispersion of the buoyancy of the head and assembly accuracy of the drive are considered.

Figure 2:
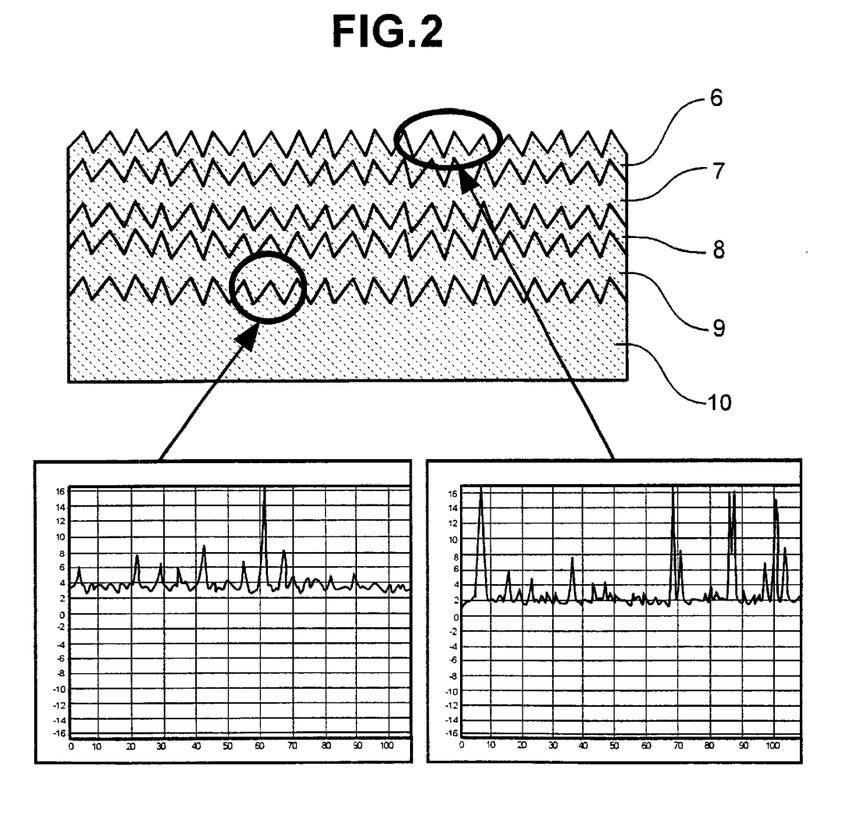
FIG. 2 shows a substrate constructed according to texture processing and a drawing of roughness data that is explanatory of the surface after the film formation.

With respect to the conventional technology, it is shown in FIG. 2, that the surface roughness of underlayers 8, 9, a magnetic film 7 and a protective film 6, which are laminated on a substrate 10, have a surface roughness dependent upon the surface roughness of the substrate. In general, the inventors' analysis of the prior art shows that the surface roughness of the finally completed magnetic recording medium is increased with respect to the surface roughness of the substrate.

Figure 3:
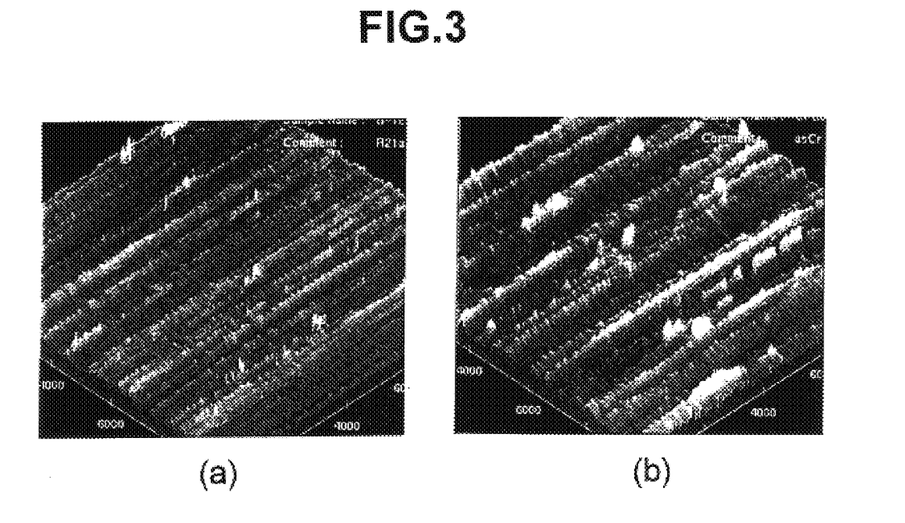
FIG. 3 shows a texture-work surface and an AFM image after Cr film formation.

FIG. 3 shows a substrate surface (a) obtained by texture-processing using abrasive grain and formed of 30 nm of Cr deposited on the substrate surface (b), and Table 1 shows data for the surfaces as measured by an atomic force microscope (AFM) for comparison.

TABLE 1

| Sample | Ra (nm) | Rp (nm) | Rmax nm) |
| --- | --- | --- | --- |
| (a) On a substrate | 1.9 | 6.2 | 7.0 |
| (b) On a Cr underlayer | 1.3 | 6.5 | 12.4 |

A numerical value, as an index to surface roughness, is obtained by the following formula for center line average roughness of the roughness curve: Ra, $$Ra = 1/L \int_0^L |f(x)| dx \qquad \text{(Equation 1)}$$

L is the length of a roughness curve (distance of actual measurement), the roughness curve (data of actual roughness was shown as a curve, and Ra is obtained by the integral of this absolute value): y=f(x).

Ra: center line average roughness shown in the above equation.

Rp: The largest center line height (largest interval with the center line in the summit in the roughness curve). Rmax; Maximum height above rail level in the roughness curve (peak to peak). The index to this surface roughness has generally been adopted. The AFN used was a NANO-SCOPE III made by DI (Digital Instruments, Inc.). As it is clear from FIG. 3 and Table 1, the substrate surface by the mechanical TEX working method has actually considerable abnormal points (protrusions), and this is shown in maximum height above rail level, Rmax. As shown in Table 1, Rmax of the underlayer shows a larger value than the substrate, because the surface which formed the underlayer reflects the surface of the substrate, and there is the growth of the protrusion of Cr by the abnormal growth which will occur in epitaxial growth of Cr at the abnormal point of the substrate. Therefore, it is not aft possible to obtain a lower flying height of the magnetic head than permitted by the roughness of the surface on magnetic recording medium produced by this prior art; this is the main cause of the crash, and the difficulty in obtaining the high recording density and R/W characteristics. Also, there is the rising probability of the magnetic head contacting the abnormal convex in the slide-proof surface.

In general, a Ni—P film is formed on the Al alloy substrate as a nonmagnetic substrate material applied by plating at about 10 μm and processing by machining the surface to a mirror surface, and then cleaning and drying after texture-processing, which used abrasive grains. Then the underlayer, magnetic layer and protective layer are formed in order in the vacuum film formation equipment, and that produces the magnetic recording medium. A hardness and Young modulus of the Ni/Al—P substrate surface used here are respectively 7, 42 Gpa and 147/Gpa (Nano Instruments, Inc.) (measurement needle: Berkovich type tip, diameter" R100 nm, material: Diamond), when it is measured by the micro penetrometer, (at the 60 nm indentation depth).

In this prior art it is easy to deform plastically the surface laminated metal layer, even if the hardness of the metal layer is high to some degree, as the whole thickness of the metal layer is laminated to about 30˜100 nm; therefore it is not possible to endure the contact impact of the magnetic head, because of the Ni—P softness and tendency of the deformation.

Therefore from the above inventors' analysis of the prior art, it is seen that the prior art texturing, while reducing the adhesion tendency between the head and medium, also increases the probability of head crash and/or significantly increases flying height or at least prevents ultra low flying height, while at the same time having a tendency to provide an easily deformed surface that will not have high reliability.

The inventors I analysis of the prior art and problems of the prior art as well as the causes of such problems are a part of the present invention.

While the prior art has addressed increased smoothness of the substrate surface and especially the substrate surface in the data area or writing and reading field, as a way of reducing flying height of the magnetic head to obtain high recording density, which is a requirement for future technology, such increased smoothness according to the prior art has increased the probability of head crash or contact at high speed. The inventors' analysis has shown that to date the prior art has not been able to accomplish the above objects without at the same time degrading other desired characteristics of other objects, that is the prior art has been unable to simultaneously improve impact resistance and move towards the future requirements of high density recording. It is an object of the present invention to overcome such problems.

It is an object of the present invention to reduce medium noise by reducing turbulence of the magnetic domain by providing flatter surface roughness of the magnetic layer and/or the protective layer relative to the surface roughness of the substrate, which cannot be obtained with the conventional magnetic recording medium, while at the same time obtaining high density recording f or the magnetic recording medium and high density storage by improving the levitation stability of the magnetic head and lowering the absolute flying height of the magnetic head.

According to the present invention, two-dimensional square mean square root roughness Rq of the magnetic layer is less than two-dimensional square mean square root roughness Rq of the substrate surface, and thereby the medium noise decreases in the data plane or field, which is the field of reading and writing by the magnetic head on the magnetic recording medium, particularly a medium having an underlayer, a magnetic layer and a protective layer. Further, according to the present invention, the two-dimensional square mean square root roughness Rq of the magnetic layer and protective layer is smaller than at least the two-dimensional square mean square root roughness Rq of the substrate surface, and at the same time the medium noise in the data plane, which is the field of reading and writing by the magnetic head on the magnetic recording medium, is reduced while reducing the absolute flying height of the magnetic head for improved levitation stability. As a result, high recording density of the magnetic recording medium is obtained.

Particularly, Rq of the substrate is 5 nm or less and Rq of the magnetic layer and protective layer are 3 nm or less, so that there is reduction of the medium noise and reduction of the flying height of the magnetic head to 20 nm or less to obtain levitation stability and ultra low flying height as well as high density recording resulting therefrom.

To obtain the flatter surface roughness according to the present invention, the surfaces, such as surfaces of the underlayer and substrate are exposed to gas ions of a plasma within a vacuum to prevent or reduce protrusions of the surface by abnormal growth of the layers to thereby reduce the surface roughness so that the smooth film is obtained without the abnormal growth protrusions.

Figure 4:
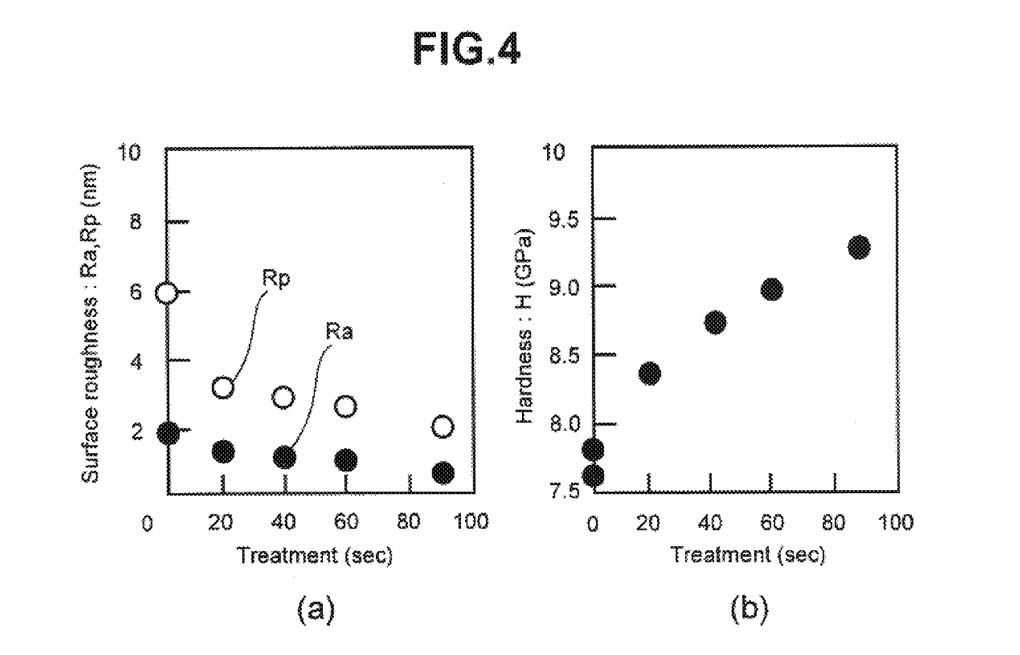
FIG. 4 shows surface roughness and hardness, according to an analysis that is a part of the present invention.

The results of conducting such surface treatment according to the present invention are shown in FIG. 4. As an underlayer, a Cr film was formed to a thickness of 30 nm on a TEX processed substrate. Ionized nitrogen gas, $N_2$, was used with parallel plate etching equipment by RF plasma to strike the substrate surface, and analysis of how the surface changed during processing time was carried out by AFM, ESCA. As a result, it was proven that the surface roughness was reduced with processing time, as shown in FIG. 4(a).

ESCA (Electron Spectroscopy for Chemical Analysis) employs X-ray photoelectron spectroscopy analytic equipment to determine surface roughness quantitatively by photoelectrons using an X-ray source; this is a base for the peculiar, scientific and material combination, and a base for measuring the energy. The measurement X-ray emission conditions were: Monochromatization X-ray (ALK α) emitted beam of beam diameter of 200 μm–44 W to an Al target as an excitation source.

The take out angle: 75 degrees.
The analysis region: the point analysis.
The pulse energy: 29.35 ev.
The energy spread: 0.125 eV.
The apparatus used was Quantum 2000, made by ULVAC PHI, Inc.: it is a Scanning ESCA Microprobe System.

Nitrogen, N, was detected at the Cr film exposed with the $N_2$, as a result of ESCA analysis of the surface, as shown in the following Table 2. It is shown that both the peak of C, which seems to be the hydrocarbon, and the peak of O decrease; and this result shows that the surface was purified. In Table 2, the electron orbits are shown by 2 p for Cr and by 1 s for C, N and O.

TABLE 2

| Sample | C1s | N1s | O1s | Cr2p |
| --- | --- | --- | --- | --- |
| Cr underlayer on substrate | 16.87 | — | 35.49 | 47.65 |
| After treatment with gas ions nitrogen with plasma | 12.12 | 25.08 | 20.46 | 42.34 |

FIG. 4(b) shows that hardness increases as the processing time increases, with surface hardness being measured by a minute penetrometer made by Nano Instruments, Inc. As a result of such examining, it is determined that in addition to using RF etching equipment, the present invention further contemplates that such ionized gas exposure may be obtained by the use of ion guns, plasma guns, etc., to obtain a similar effect.

The above results show a surface flattening of the substrate and/or the underlayer by processing with gas ions, particularly nitrogen gas ions, in the form of a plasma accelerated into the surface to produce migration of only the pole surface of the metal layer by a rise in the temperature of the pole surface of a film. The atomic radius of the N atom, which atomic radius is 0.52 Å (0.053 nm), is much smaller than the size of the metallic protrusion radius that is about 1.25 Å. Therefore, it appears that the N atom penetrates into the film without having the physical etching action, and as a result the metal appears to migrate as most of the ionized gas energy is converted into thermal energy, which results in a flattening of the surface roughness. While some etching may occur, substantial etching does not and it appears that the important factor is this increased heat that produces a melting and migration of the metal protuberances for a general flattening, and therefore a highly micro amorphous structure is obtained because the surface of the metal film is changed to a nitride. Therefore, the crystal grain of film laminated at the upper part of the metal film becomes smaller, and as a result, roughness of the magnetic layer surface and protective layer surface becomes smaller as compared with the roughness of the substrate and as compared to such surface without such processing. By this reduction of surface roughness of the magnetic layer and of the protective layer, high density recording is obtained by reduction of medium noise and improvement of the magnetic head levitation stability in the ultra low levitation region is achieved.

BRIEF DESCRIPTION OF THE DRAWING

Further objects, features and advantages of the present invention will become more clear from the following detailed description of a preferred embodiment as shown in the drawing, wherein.

DETAILED DESCRIPTION OF THE EMBODIMENTS

Figure 5:
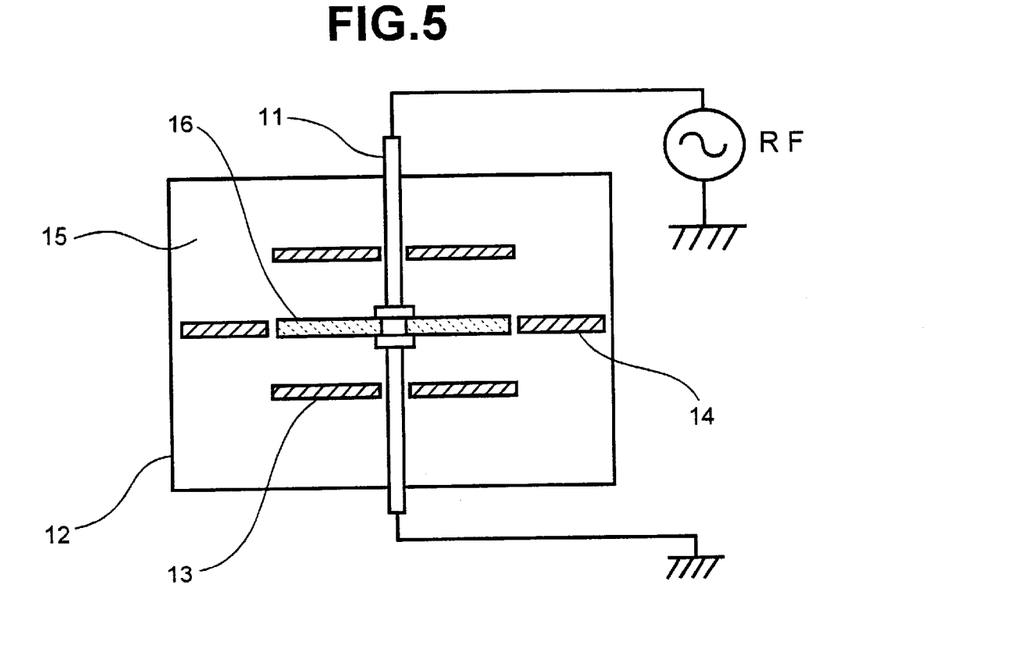
FIG. 5 discloses RF etching equipment used as a practical example of equipment employed in the present invention.
Figure 6:
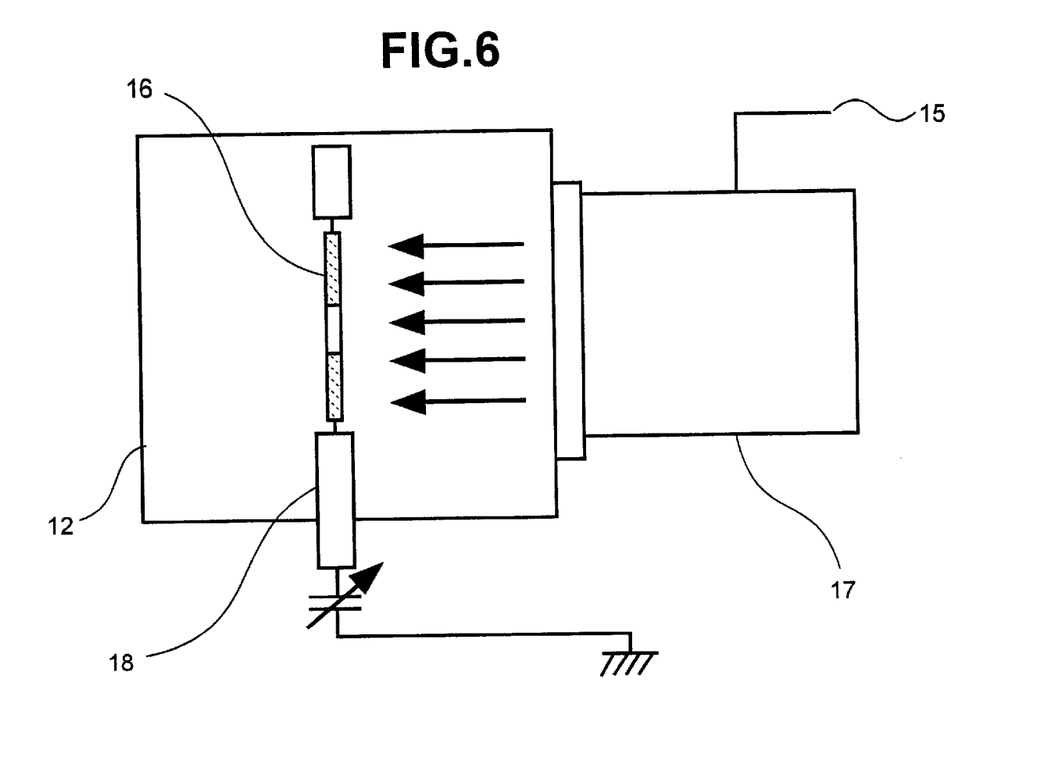
FIG. 6 shows ion gun apparatus as equipment that is a practical example of that used in the present invention.

In the execution of this invention, RF etching equipment and ion gun apparatus was used, as shown in FIGS. 5, 6 to expose both sides of the disk simultaneously, and optionally control gas flow rates (pressure), processing time, charge power, acceleration voltage, etc. The ultimate vacuum is on the order of 10E–5 Pa. FIG. 5 is a schematic drawing of a RF processing unit that retains substrate 16 by electrode 11 and antagonism electrode 13 that are placed at the top and bottom of the substrate, and which unit controls the concentration of the plasma by circumference electrode 14. The substrate 16 is exposed by introducing the processed gas into chamber 12 and applying RF energy to electrode 11. FIG. 6 is a schematic drawing of the ion gun which was used in this invention to expose the surface of substrate 16 held by clamp 18. The process gas was introduced into ion gun 17 from installation port 15 and ionized for irradiating the ionized gas to the substrate 16 in chamber 12, simultaneously for both sides of the substrate by using the ion gun 17 disposed to both sides of the substrate.

A 2.5 in φ Ni—P/Al substrate was used after texture-processing, cleaning by pure water and drying by spin drying. As a comparison example, the evaluation was carried out using the texture-procepsed substrate itself and a S/F (Super-Finish) substrate without the above processing. Respective layers were formed by sputtering equipment (MIDP250 made by INTEVAC, inc.) and evaluated, one of which layers had the ion gas processing of this invention.

In the manufacture of the sample, to begin with, the Ni—P plating Al substrate was processed using diamond abrasive grain #30000 to obtain the texture, was washed and was dried, and next, processed according to this invention using apparatus shown at FIGS. 5, 6. The processing conditions are shown at Table 3.

TABLE 3

| Sample | Introduced electric power | Time (sec) | Pressure (Pa) | Voltage (V) |
|---|---|---|---|---|
| Embodiment 1 | 90 | 45 | 39.9 | 550 |
| Embodiment 2 | 90 | 90 | 39.9 | 550 |
| Embodiment 3 | 45 | 120 | 39.9 | 350 |
| Embodiment 4 | 120 | 45 | 39.9 | 750 |
| Embodiment 5 | 200 | 5 | 0.67 | 150 |
| Embodiment 6 | 200 | 10 | 0.67 | 100 |
| Embodiment 7 | 100 | 20 | 0.67 | 200 |
| Comparative Embodiment 1 | 300 | 30 | 0.67 | 250 |
| Comparative Embodiment 2 | No treatment | | | |
| Comparative Embodiment 3 | No treatment | | | |

Mainly, processing time, charge electric power, voltage, and pressure (39.9 Pa constant in RF, 0.67 PA constant in ion gun) were amounts at which etching did not occur. The charge power was set as a standard of energy amount which the substrate receives, in order to make the ion current density to be 2 mA/cm2 or less, and in order to obtain 200 eV or less as the energy at which the ion collides with the substrate. The substrate temperature in the processing was room temperature.

In formation of each underlayer, magnetic layer and protective layer with processing of this invention, the ultimate vacuum of film formation equipment was exhausted at 2.7E−5 Pa or less. Afterwards, pre-sputtering of 150 sheets was carried out in the damy-substrate in order to adjust cleaning of the target surface and condition of the facility. The ultimate vacuum after the pre-sputter was 8.6E−6 Pa. Cr, Cr—Ti was the underlayer, CoCrTa, CoCrPt was the magnetic layer, and Carbon (Graphite) was the protective layer. Table 4 shows the film thickness (nm), the layer composition, and the substrate temperature in the sputter was 250° C.

TABLE 4

| | Substrate | Shape | Underlayer 1 | Underlayer 2 | Magnetic layer | Protective layer |
|---|---|---|---|---|---|---|
| Embodiment 1 | Al | TEX | CrTi(30) | | CoCrPt(23) | Sp-CN(12) |
| Embodiment 2 | Al | TEX | Cr(28) | | CoCrTa(30) | Sp-CN(14) |
| Embodiment 3 | Al | TEX | Cr(30) | Cr(20) | CoCrTa(28) | Sp-CN(15) |
| Embodiment 4 | Al | TEX | Cr(30) | | CoCrTa(30) | Sp-CN(14) |
| Embodiment 5 | Al | TEX | Cr(30) | CrTi(28) | CoCrPt(25) | DLC(4) |
| Embodiment 6 | Al | TEX | Cr(25) | | CoCrTa(28) | Sp-CN(13) |
| Embodiment 7 | Al | TEX | Cr(25) | | CoCrTa(28) | DLC(13) |
| Comparative embodiment 1 | Al | TEX | Cr(30) | Cr(20) | CoCrTa(28) | Sp-CN(14) |
| Comparative embodiment 2 | Al | TEX | Cr(30) | | CoCrTa(20) | Sp-CN(12) |
| Comparative embodiment 3 | Al | S/F | Cr(25) | | CoCrTa(25) | Sp-CN(14) |

In the Table 4, the bold line frame shows the layer which had the surface treatment of this invention. Film formation speed of the underlayer was 7 nm/sec, film formation speed of the magnetic layer was 10 nm/sec, film formation speed of the protective layer was 1.1 nm/sec, and sputtering gas and gas pressure in the film formation were argon, Ar (the 99.9999% purity and 0.93 Pa pressure in all layers. However, $N_2$ was added (30% of Ar) in the protective layer to obtain a nitrogen addition film.

The diamond-like carbon DLC film 5, 7 of the practical example was formed by IBD-CVD (ion beam-chemical vapor deposition). The CH4/Ar gas mixture ratio was 70:30, gas pressure was 1.33 Pa, acceleration voltage was 200V, and film formation speed was 1 nm/sec.

After film formation, the disk was cleaned using polishing tape having 3 $\mu$m $\phi$ alumina abrasive grain fixed in the tape, at a press force of 20 g, disk rotational frequency of 2000 rpm. Then fluoro ether at a molecular weight of 2000 was diped as a lubricant to form the thickness of about 20 Å (2 nm).

The evaluation was carried out on the samples made by above-mentioned method in the following way.

The X-ray reflection method was used, since it is necessary to measure the surface roughness in each layer after the forming of layers as an evaluation method of a practical example and comparison example of this invention, and since a traceable measurement machine, which has been used conventionally, cannot measure only the upper most surface. By this method, if is possible to obtain simultaneously, individual film thickness and surface roughness Rq(Rms) of the multilayer or laminate. The calculation method using fresnel reflection coefficient described at S. K. Sinha, E. B. Sirota, S.Garoff and H. B. Stanley : Phys.Rev.B38(1988)2297 was adopted in the measurement.

The fresnel's reflection coefficient Fj, j+1 of the films j and j+1 are given in the following equations in case of the interface having the roughness.

$$F^\sigma_{j;j+1}=F_{j;j+1}\exp(-8\pi^2 g_j g_{j+1}\sigma^2_{j+1}/\lambda^2) \quad \text{(Equation 2)}$$

$$g_j \sqrt{n_j^2 - \cos^2\theta} \quad \text{(Equation 3)}$$

$$\sigma_{j+1}=\sqrt{\int_{s0}(Z-a)^2 dxdy/S_0} \quad \text{(Equation 4)}$$

$\sigma$ j+1 term shows the roughness (Rq:Rms=two-dimensional mean square root roughness ) of the interface. In the above equations, nj=complex index of refraction, $\theta$=incidence angle of the X-ray, $\lambda$=wavelength of X-ray, Z=value of each point, a=mean value of measuring whole point, S0=measurement area.

In case of the ruggedness in the interface of film j+1 and film j, the reflectivity is obtained from Equation 2 by correcting the fresnel reflection coefficient, when Equation 4 is applied to Equation 2 to obtain an approximate value, by regarding the change of average electron density caused by the above ruggedness to be a Gaussian function of half-value width $\sigma$j+i.

In this invention, the measurement was carried out using the above evaluation method. Equipment and measurement conditions for the measurement are as follows.

The measuring device was the GXR2 type made by RIGAKU, and CuK $\alpha$ was taken out by the Ge (111) crystal spectroscope using a Cu target for X-ray source at tube voltage 50 kV and tube current 40 mA. The following were set to the spectroscope: Incidence Slit 50 μm; Injection Slit 100 μm; and Height 2 mm. The scanning of detector and sample was done in the θ/θ scanning (the method of fixing the sample and changing the angle of the detector to the same angle of incidence angle θ of X-ray). Only the regular reflection was detected at detection slit width 100 μm, 2 mm height. Angle step 0.002° and θ=0.15~1.2° at the 0.08° /min speed were measured continuously in order to get the S/N improvement.

The surfaces after forming films were observed by AFM made by Digital Instruments, Inc. The measurement condition was made to measurement area 10 μm 2, scan speed 0.5 Hz, and tapping mode.

On the hardness, the minute penetrometer (Measurement Needle: Berkovich Type, Tip Diameter R: 10 nm, Material: Diamond) made by Nano Instruments, Inc, was used. The hardness was measured and compared under the condition that indentation speed was 1 nm/s, maximum depth was 150 nm, indentation depth was 60 nm.

The magnetic characteristic was measured using Vibrating Sample Magnetometer model BHV-50 (made by the RIKEN DENSHI CO., Ltd.) in 10 k Gauss of impression magnetic field, 1 k L: Gauss/min of sweep coming speed.

The evaluation of corrosion resistance used SIMS (TTS-2000 made by Oryx Instruments and Materials Corp.) in the constant temperature constant humidity tank after the 24 hour exposure and neglect at 28° C./90%RHm employed in the change of the ratio of count number/carbon quantity of the Ni quantity of the count number which deposited on the surface. Normalized noise of Equation 5: "kNd" was used in the evaluation of medium noise of the R/W characteristics as a definition of the medium noise coefficient. This definition is shown in the following.

$$kNd = Nd \times \sqrt{Twr}/E_{isoPP} \quad \text{(Equation 5)}$$

In the above formula, normalized noise, kNd, shows disk noise integrated in the band from Nd=0.5 MHz to 1.05 times the most high density (360 kfci) in output. Here, Eisopp, Twr, shows isolation regeneration wave and readout track width at 20 kfci, which was measured, compared and examined.

Hto, levitation start height of the magnetic head was measured as the rotational frequency of the disk was lowered until the head contacted a piezo element. Since the flying height of the magnetic head is most preferably 20 nm or less in this invention, the dispersion of magnetic disk, magnetic head, magnetic head assembly, assembly accuracy such as the spacer and flying height of magnetic head was considered. As said before, we forwarded our estimation considering that in order to be 20 nm or less of the flying height of magnetic head, 10 nm or less of the levitation start height of the magnetic head Hto was desired.

High-speed contact proof stress and tangential force was measured in the condition that the magnetic head always contacted the disk surface, when the rotational frequency of the disk was fixed at 4200 rpm, and we maintained the atmosphere at a degree of vacuum of about 26600 Pa.

Figure 7:
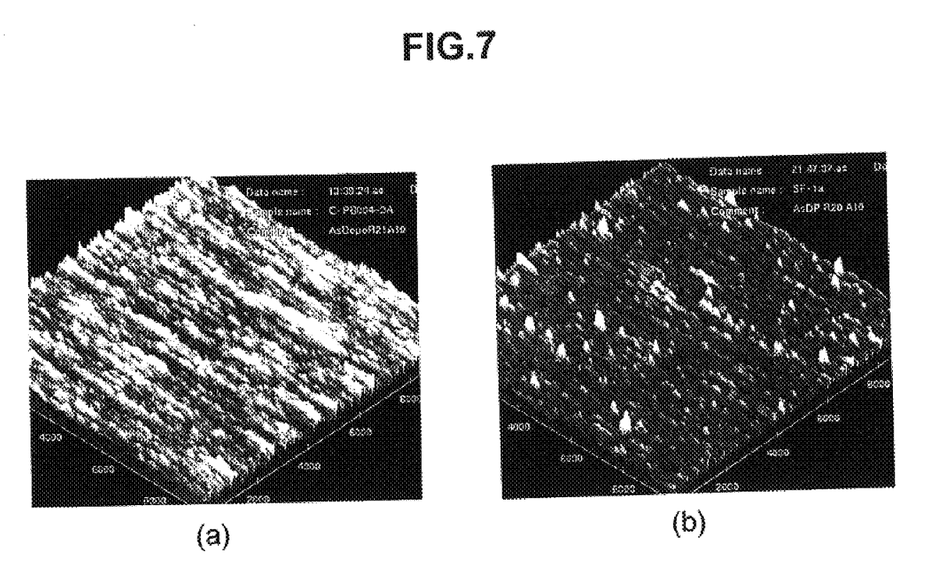
FIG. 7 is part of an AFM image, as a practical example of the present invention.

The sample by the method described above provided evaluation results shown in Tables 5, 6, 7 and FIG. 7.

TABLE 5

| Layer | Thickness (nm) | Rq | Layer | Thickness (nm) | Rq |
|---|---|---|---|---|---|
| Embodiment 1 | | | Embodiment 2 | | |
| C | 11.66 | 1.49 | C | 13.59 | 2.66 |
| CoCrPt | 22.82 | 1.41 | CoCrTa | 29.85 | 1.73 |
| CrTi | 29.67 | 0.80 | Cr | 21.17 | 0.71 |
| Ni-P | | 1.53 | Ni-P | | 3.40 |
| Embodiment 3 | | | Embodiment 4 | | |
| C | 14.67 | 1.97 | C | 13.91 | 1.69 |
| CoCrTa | 28.29 | 2.10 | CoCrTa | 29.27 | 1.74 |
| Cr | 20.85 | 1.04 | Cr | 30.36 | 0.21 |
| Cr | 30.92 | 0.56 | Ni-P | | 2.84 |
| Ni-P | | 2.25 | | | |
| Embodiment 5 | | | Embodiment 6 | | |
| DLC | 3.63 | 0.35 | C | 13.26 | 1.73 |
| CoCrPt | 24.50 | 2.10 | CoCrTa | 27.65 | 2.12 |
| CrTi | 27.65 | 0.88 | Cr | 24.50 | 1.25 |
| Cr | 30.23 | 0.74 | Ni-P | | 4.32 |
| Ni-P | | 2.25 | | | |
| Embodiment 7 | | | Comparative embodiment 1 | | |
| DLC | 13.26 | 0.80 | C | 14.68 | 5.12 |
| CoCrTa | 27.65 | 0.67 | CoCrTa | 28.31 | 7.27 |
| Cr | 24.50 | 0.65 | Cr | 20.23 | 3.33 |
| Ni-P | | 0.83 | Cr | 29.19 | 2.31 |
| | | | Ni-P | | 7.11 |
| Comparative embodiment 2 | | | Comparative embodiment 3 | | |
| C | 11.77 | 4.26 | C | 14.22 | 4.61 |
| CoCrTa | 20.25 | 3.22 | CoCrTa | 25.25 | 3.27 |
| Cr | 30.22 | 3.79 | Cr | 25.10 | 2.46 |
| Ni-P | | 3.23 | Ni-P | | 0.80 |

TABLE 6

| Sample | Hc(Oe) | S* | Normalized noise:Knd | Head take off height:Hto (nm) | Ra (nm) | Rp (nm) |
|---|---|---|---|---|---|---|
| Embodiment 1 | 2100 | 0.78 | 0.022 | 6 | 1.5 | 3.4 |
| Embodiment 2 | 1850 | 0.72 | 0.021 | 4 | 0.65 | 2.21 |
| Embodiment 3 | 2350 | 0.81 | 0.024 | 8 | 0.55 | 1.68 |
| Embodiment 4 | 1750 | 0.66 | 0.023 | 3.5 | 0.32 | 0.98 |
| Embodiment 5 | 2200 | 0.81 | 0.024 | 6.2 | 0.43 | 1.60 |
| Embodiment 6 | 2000 | 0.76 | 0.023 | 3.6 | 0.36 | 1.32 |
| Embodiment 7 | 2430 | 0.82 | 0.020 | 8.3 | 0.92 | 2.23 |
| Comparative Embodiment 1 | 1840 | 0.72 | 0.032 | 28.1 | 0.30 | 0.93 |
| Comparative Embodiment 2 | 2400 | 0.84 | 0.026 | 17.0 | 1.9 | 5.8 |

TABLE 6-continued

| Sample | Hc(Oe) | S* | Normalized noise:Knd | Head take off height:Hto (nm) | Ra (nm) | Rp (nm) |
|---|---|---|---|---|---|---|
| Comparative Embodiment 3 | 1780 | 0.63 | 0.027 | 12.0 | 0.34 | 2.1 |

TABLE 7

| Sample | Durability of highspeed sliding friction | Friction | Hardness | Corrosion resistance |
|---|---|---|---|---|
| Embodiment 1 | ≧10K | 15.3 | 8.8 | |
| Embodiment 2 | ≧10K | 8.5 | 9.6 | |
| Embodiment 3 | ≧10K | 12.5 | 9.1 | 0.4 |
| Embodiment 4 | ≧10K | 6.2 | 10.2 | |
| Embodiment 5 | ≧10K | 9.6 | 9.4 | |
| Embodiment 6 | ≧10K | 6.2 | 12.4 | |
| Embodiment 7 | ≧10K | 12.4 | 9.0 | 0.35 |
| Comparative Embodiment 1 | 5.3K | 10.5 | 9.2 | |
| Comparative Embodiment 2 | 2K | 20.5 | 7.4 | 5.13 |
| Comparative Embodiment 3 | 0.5K | ≧25 | 7.0 | 2.82 |

To begin with, the value of two-dimensional square mean square root roughness Rq(Rms) of each layer measured by the X-ray reflection method is shown in Table 5. In the sample processed by this invention, the values of two-dimensional square mean square root roughness Rq of the magnetic layer and the protective layer become 0.35~2.66 and 3 nm or less in case that the values of two-dimensional square mean square root roughness Rq of the substrate are 0.83~4.32 and 5 nm or less regardless of the layer composition. The Rq of the magnetic layer and the protective layer become smaller in either practical example than the Rq of the substrate.

In the comparison example 2, 3 the following were shown: Result of forming film without the Texture processing and result of forming film without the Texture processing in the substrate of S/F. Rq of the protective film and the magnetic film shows 3 nm or more against the Rq of the substrate for 0.8, 3.23, and it is shown that the Rq of the laminated film increases in comparison with this invention. It was shown in comparison example 1 that Rq of the substrate surface (by the texture) was 7.11 nm and exceeded 5 nm, and the processing of this invention was conducted. This result shows that even if the processing of this invention is conducted, it is not effective, when Rq of the substrate was too great.

FIG. 7(a) is an AFM image of the practical example, and FIG. 7(b) is a part of an AFM image of the comparison example. It is clear that there is a large difference in the shape of the completed disk surface.

Results of evaluating the disk which showed the value of surface Rq of the foregoing are shown in Tables 6, 7. The measurement results of Hc, S* of the magnetostatic characteristics and normalized noise Knd of the R/W characteristics and levitation start height Hto of the magnetic head are shown in Table 6. From the magnetic characteristic, there was no problem of showing appropriate values in both practical examples and comparison examples, and especially, there was no problem of disturbing magnetic characteristic by the processing of this invention.

As for the normalized noise, it is proved that this invention reduced noise in each of the practical examples as compared with the comparison example.

The levitation start height Hto satisfies 10 nm or less in all the practical examples, but increases to 12.0~28.1 nm in the comparison examples. Especially, in comparison example 1, Rq of the substrate increases with 7.11 nm, as it was mentioned earlier, and the levitation start height also rises with 28.1 nm. It is recognized that the roughness Rq of the substrate is preferably 5 nm or less to satisfy the 20 nm or less levitation height of the magnetic head.

High-speed contact proof stress, friction, hardness and corrosion resistance are shown in Table 7. From the Table 7, all practical examples had the proof stress over 10KPass on high-speed contact proof stress, on the other hand, comparison examples had 6KPass or less. The tangential force showed 20 grf or less in this practical example, and it was over 20 grf, for the comparison example 1 which had the roughness Rq of the substrate shown in Table 5 as 7.11 nm, which showed 10.5 grf numerical value. The hardness shows 8.8 Gpa~12.4 Gpa in the practical example, and it is proven that it is clearly improved in comparison with 7.4,7.0 Gpa of the untreated article of comparison examples 2, 3. In the practical example, all of the corrosion resistances were under ⅕ of the comparison examples, and almost all of the corrosion resistances were under a detection limit (about 0.5).

From these results, according to the practical example of this invention, the surface roughness of the magnetic layer and the protective layer can be drastically reduced. The levitation stability of the magnetic head of 20 nm flying height or less of magnetic head in the ultra low levitation region, that it, magnetic head levitation start height Hto was obtained and lowered. Security of the slide-proof in the low levitation region, achievement of the high density recording, reduction of the medium noise, and improvement in corrosion resistance were obtained. In addition, the hardness was improved, the mechanical characteristic was improved by this, and slide-proofness of the magnetic disk surface was rapidly improved.

From comparison example 1, it is proven that there is a large effect by using this invention, even if surface roughness Rq of the substrate is big, in tangential force, hardness, corrosion resistance.

Figure 8:
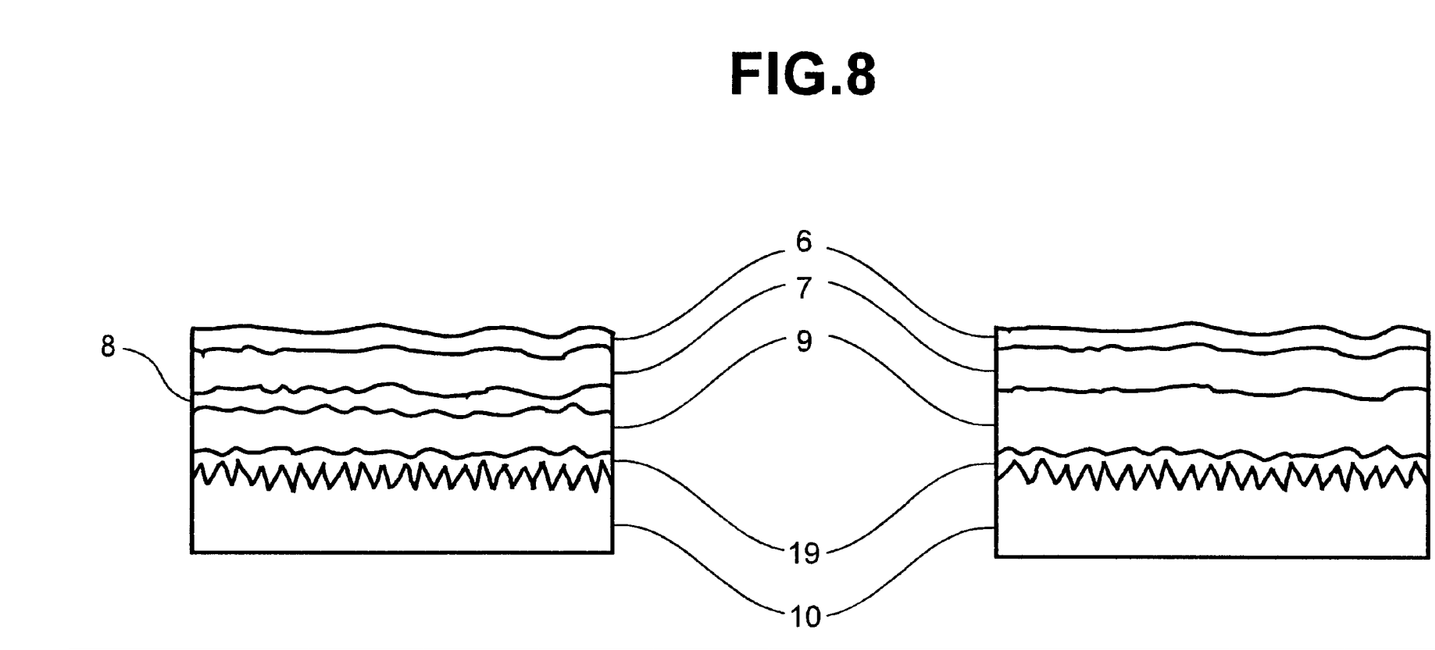
FIG. 8 is a cross sectional view of a magnetic recording medium of the present invention.

As shown in FIG. 8, the magnetic disk of the present invention has underlayer 19 on substrate 10 and the second underlayer 9, magnetic layer 7, and protective layer 6 formed in order. The effects are the same even if the underlayer has first and second layers, that is, multilayers, and not the composition shown in FIG. 8. Still, the similar effect is obtained, even if the magnetic layer or protective layer is a multilayer.

Figure 9:
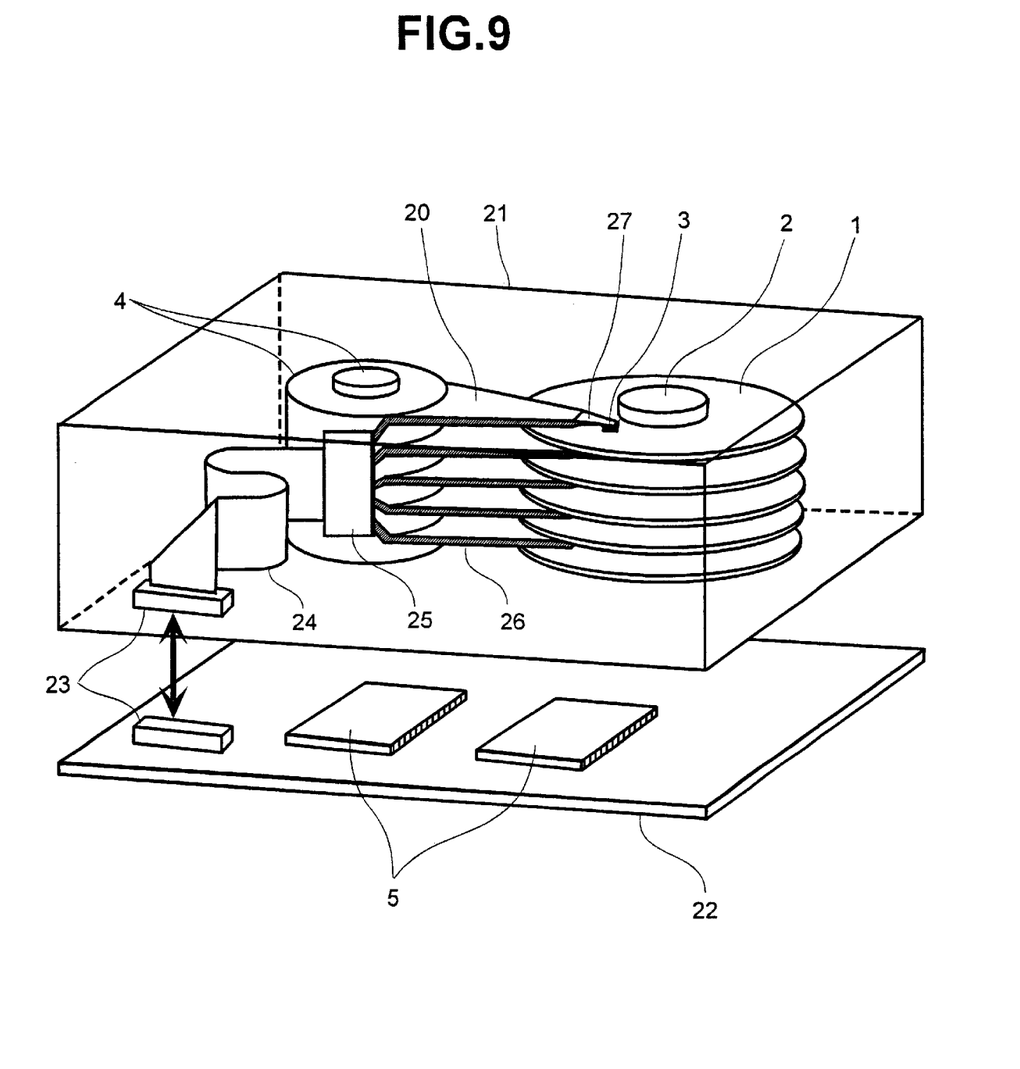
FIG. 9 is a schematic drawing of the magnetic storage apparatus of the present invention using the magnetic recording medium of FIG. 8.

FIG. 9 is a schematic drawing of magnetic storage apparatus which includes the above disclosed magnetic disk of this invention. Magnetic recording medium 1 of this invention is included with spindle 2, and magnetic head suspension 27 and magnetic head 3 installed through magnetic head arm 20, which is installed in servomechanism 4 at the tip. Information is transmitted by sending R/W signals from the magnetic head 3 through a combination connector 23 into the electric circuit 5 that is on a R/W circuit board 22 by way of a lead wire 26, a lead wire cluster connector 25, and a flexible and flat wiring 24. The above-mentioned parts are in the box body 21 to fix them as the magnetic storage apparatus that was tested for 10000 hours, but the symptom as a failure did not arise especially.

According to this invention, the medium noise decreases, levitation stability of the magnetic head in the ultra low levitation region is obtained and the high density recording is obtained for a magnetic recording medium of a magnetic disk apparatus of high reliability.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. A magnetic recording medium having a field of writing and reading by a magnetic head, said medium comprising:
   a substrate;
   a magnetic layer;
   a protective layer;
   said substrate having a two-dimensional square average square root roughness Rq that is 5 nm or less;
   said magnetic layer having a two-dimensional square average square root roughness Rq that is less than the two-dimensional square average square root roughness Rq of said substrate in the field of writing and reading;
   an underlayer selected from the group consisting of Cr and CrTi;
   said substrate being a Ni—P/Al substrate;
   said magnetic layer being selected from the group consisting of CoCrTa and CoCrPt on said underlayer;
   said underlayer being on said substrate; and
   said protective layer being selected from the group consisting of C and DLC.

2. A magnetic recording medium having a field of writing and reading by a magnetic head, said medium comprising:
   a substrate;
   a magnetic layer;
   a protective layer;
   said substrate having a two-dimensional square average square root roughness Rq that is 5 nm or less;
   said magnetic layer having a two-dimensional square average square root roughness Rq that is less than the two-dimensional square average square root roughness Rq of said substrate in the field of writing and reading;
   wherein corrosion resistance of said magnetic recording medium, as measured by change in a count number ratio of C quantity and Ni quantity deposited on the surface of the field of writing and reading of said magnetic recording medium at a constant temperature of 28° C. and constant humidity of 90% in a RH tank during 24 hour exposure and neglect by using SIMS, is under 0.5;
   an underlayer selected from the group consisting of Cr and CrTi;
   said substrate being a Ni—P/Al substrate; said magnetic layer being selected from the group consisting of CoCrTa and CoCrPt on said underlayer;
   said underlayer being on said substrate; and said protective layer being selected from the group consisting of C and DLC.

3. A magnetic recording medium having a field of writing and reading by a magnetic head, said medium comprising:
   a substrate;
   a magnetic layer;
   a protective layer;
   said substrate having a two-dimensional square average square root roughness Rq that is 5 nm or less;
   said magnetic layer having a two-dimensional square average square root roughness Rq that is less than the two-dimensional square average square root roughness Rq of said substrate in the field of writing and reading;
   wherein corrosion resistance of said magnetic recording medium, as measured by change in a count number ratio of c quantity and Ni quantity deposited on the surface of the field of writing and reading of said magnetic recording medium at a constant temperature of 28° C. and constant humidity of 90% in a RH tank during 24 hour exposure and neglect by using SIMS, is under 0.5;
   wherein a two dimensional square average square root roughness Rq of said protective layer is flatter than a two dimensional square average square root roughness Rq of said substrate in the field of writing and reading;
   an underlayer selected from the group consisting of Cr and CrTi;
   said substrate being a Ni—P/Al substrate; said magnetic layer being selected from the group consisting of CoCrTa and CoCrPt on said underlayer;
   said underlayer being on said substrate; and
   said protective layer being selected from the group consisting of C and DLC.

4. A magnetic recording medium having a field of writing and reading by a magnetic head, said medium comprising:
   a substrate;
   a magnetic layer;
   a protective layer;
   said substrate having a two-dimensional square average square root roughness Rq that is 5 nm or less; and
   said magnetic layer having a two-dimensional square average square root roughness Rq that is less than the two-dimensional square average square root roughness Rq of said substrate in the field of writing and reading;
   wherein a surface hardness of said magnetic recording medium is over 8.8, as measured at a pushing speed of 1 nm/s, in maximum depth 150 nm and a pushing depth of 60 nm by using a minute penetrometer having a diamond measurement needle of Berkovich type with a tip diameter of 100 nm;
   wherein a two-dimensional square average square root roughness Rq of said magnetic layer and said protective layer is 3 nm or less;
   an underlayer selected from the group consisting of Cr and CrTi; said substrate being a Ni—P/Al substrate;
   said magnetic layer being selected from the group consisting of CoCrTa and CoCrPt on said underlayer;
   said underlayer being on said substrate; and
   said protective layer being selected from the group consisting of C and DLC.

* * * * *